(12) United States Patent
Mukunoki

(10) Patent No.: US 9,812,934 B2
(45) Date of Patent: Nov. 7, 2017

(54) INVERTER DEVICE AND INVERTER-INTEGRATED ELECTRIC MOTOR

(71) Applicant: Mitsubishi Electric Corporation, Chiyoda-ku (JP)

(72) Inventor: Yasushige Mukunoki, Chiyoda-ku (JP)

(73) Assignee: Mistubishi Electric Corporation, Chiyoda-ku (JP)

( * ) Notice: Subject to any disclaimer, the term of this patent is extended or adjusted under 35 U.S.C. 154(b) by 304 days.

(21) Appl. No.: 14/771,665

(22) PCT Filed: Sep. 26, 2013

(86) PCT No.: PCT/JP2013/076069
§ 371 (c)(1),
(2) Date: Aug. 31, 2015

(87) PCT Pub. No.: WO2014/171023
PCT Pub. Date: Oct. 23, 2014

(65) Prior Publication Data
US 2016/0013706 A1    Jan. 14, 2016

(30) Foreign Application Priority Data

Apr. 16, 2013 (JP) ................................. 2013-085413

(51) Int. Cl.
*H02K 11/00*   (2016.01)
*H02K 11/02*   (2016.01)
(Continued)

(52) U.S. Cl.
CPC ........... *H02K 11/02* (2013.01); *H02K 11/024* (2013.01); *H02K 11/05* (2016.01); *H02K 11/33* (2016.01);
(Continued)

(58) Field of Classification Search
CPC .. H02M 7/537; H02K 11/024; H02K 11/0073
(Continued)

(56) References Cited

U.S. PATENT DOCUMENTS

| 2008/0136265 A1 | 6/2008 | Mizukoshi et al. |
| 2010/0013438 A1* | 1/2010 | Anwar ................ B60L 11/1816 320/138 |

(Continued)

FOREIGN PATENT DOCUMENTS

| JP | 2008 167641 | 7/2008 |
| JP | 2011 250488 | 12/2011 |

OTHER PUBLICATIONS

International Search Report dated Dec. 10, 2013 in PCT/JP2013/076069 filed Sep. 26, 2013.

*Primary Examiner* — Hanh Nguyen
(74) *Attorney, Agent, or Firm* — Oblon, McClelland, Maier & Neustadt, L.L.P.

(57) ABSTRACT

An inverter device is formed of the two systems of inverters stored inside a cylindrical metal casing. Each inverter converts DC power to three-phase AC power. The inverters are formed of power semiconductor elements, DC bus bars through which DC power supplied to the respective power semiconductor elements, capacitors connected to the DC bus bars, and switches connected between the respective DC bus bars and the DC input terminals. High-impedance switches are disposed in the vicinity of the DC input terminals. Hence, electromagnetic noises generated by switching actions of the power semiconductor elements are circulated within the inverters by way of the capacitors and eventually attenuated.

8 Claims, 13 Drawing Sheets

(51) Int. Cl.
*H02K 11/05* (2016.01)
*H02M 7/537* (2006.01)
*H02K 11/33* (2016.01)
H02M 7/493 (2007.01)
H02M 7/00 (2006.01)

(52) U.S. Cl.
CPC ............ *H02M 7/537* (2013.01); *H02M 7/003* (2013.01); *H02M 7/493* (2013.01)

(58) Field of Classification Search
USPC .......................... 310/68 R, 68 A, 68 B, 68 C
See application file for complete search history.

(56) References Cited

U.S. PATENT DOCUMENTS

| | | | |
|---|---|---|---|
| 2010/0117570 A1* | 5/2010 | Nishimori ............ | H02M 7/003 318/400.3 |
| 2011/0285336 A1* | 11/2011 | Fujita .................... | H01L 25/072 318/400.27 |
| 2011/0286185 A1 | 11/2011 | Abe et al. | |
| 2012/0062176 A1* | 3/2012 | Hasan ...................... | B60L 7/14 320/109 |
| 2013/0049666 A1* | 2/2013 | Osugi .................... | H02P 27/08 318/503 |

* cited by examiner

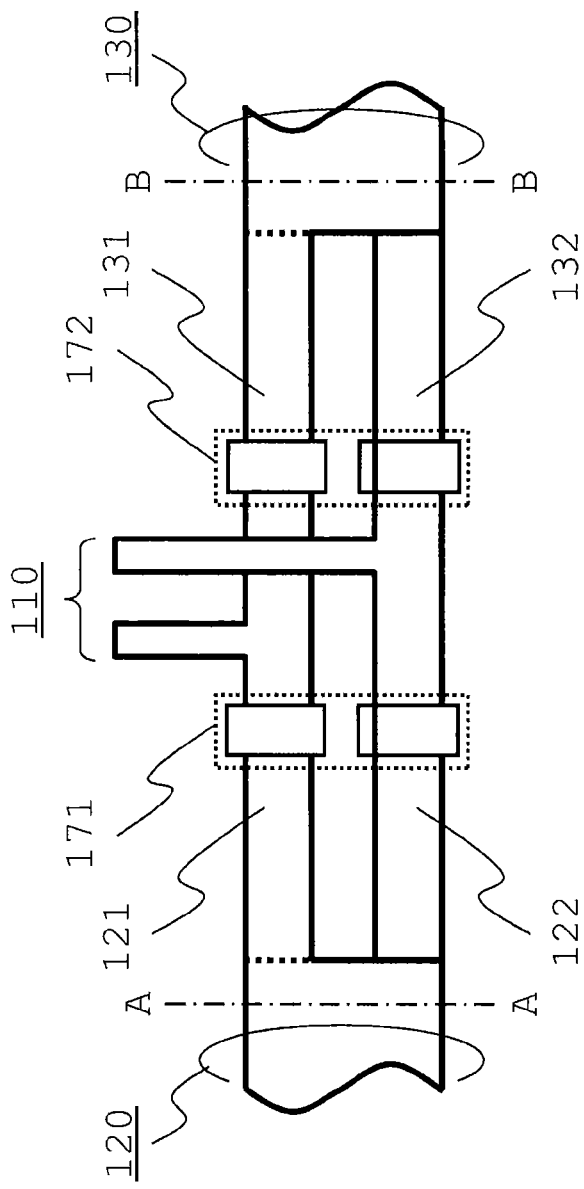
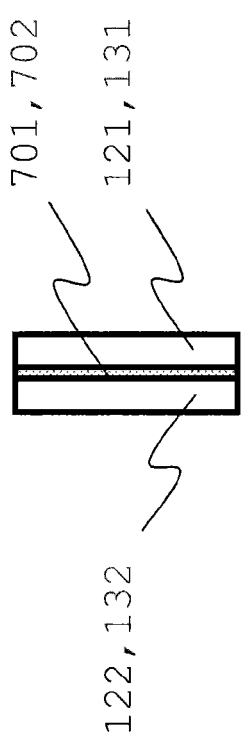
FIG.12A
FIG.12B

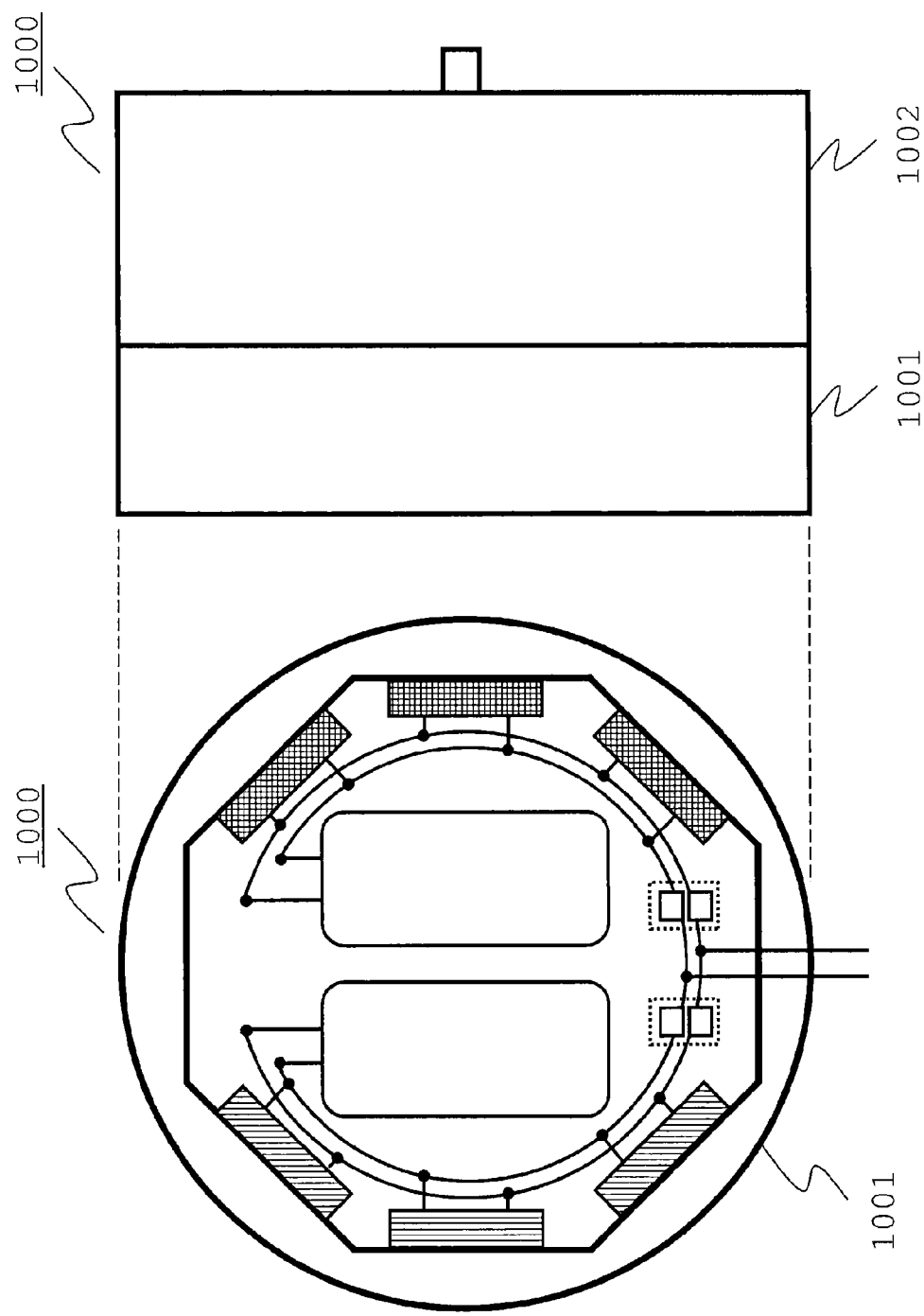

INVERTER DEVICE AND INVERTER-INTEGRATED ELECTRIC MOTOR

TECHNICAL FIELD

The present invention relates to an inverter device including an inverter that converts DC to AC and to an inverter-integrated electric motor.

BACKGROUND ART

Electrically-driven automobiles, such as a hybrid car and an EV, are becoming popular recently. An electrically-driven automobile is equipped with an inverter and the automobile runs by driving an electric motor using a power conversion function of the inverter. An in-vehicle inverter device formed of inverters in multiple systems has been developed. According to the multi-system inverter configuration, even when an inverter in anyone of the systems fails, an inverter in another system can complement to the failed inverter and vehicle driving can be continued. Consequently, reliability of vehicle driving can be enhanced.

One of problems of the in-vehicle inverter device is electromagnetic noises caused by a switching action of the inverter. Electromagnetic noises possibly trigger a malfunction of the inverter itself or a malfunction of peripheral electronic devices. Hence, there is a strong request to reduce the electromagnetic noises. As a countermeasure against electromagnetic noises, for example, PTL 1 describes an inverter device having two systems of three-phase AC inverters that drive a motor. In this inverter device, a choke coil and an electrolytic capacitor are electrically connected between a battery and a power-supply relay. The choke coil and the electrolytic capacitor together form a filter circuit so as to reduce electromagnetic noises transmitted from other devices that share the battery and electromagnetic noises transmitted from the drive device to other devices that share the battery.

CITATION LIST

Patent Literature

PTL 1: JP-A-2011-250488

SUMMARY OF INVENTION

Technical Problem

The inverter device of PTL 1 has the choke coils interposed on a power-supply line in common among semiconductor modules. Hence, noises on the power-supply line can be eliminated. However, because the choke coils are collectively interposed on the power-supply line in common, choke coils having large impedance characteristics are required to reduce noises. This inverter device therefore has a problem that a size of the choke coils is naturally increased and so is the cost in addition, because the choke coil is formed by coiling a winding wire, it is difficult to increase the number of turns with a winding wire which can flow a large current, and to achieve desired inductance. Desired inductance can be obtained by increasing the number of turns, but a size of the choke coils would be further increased and so as the cost. Moreover, interposing the choke coils poses a design problem as to where the choke coils are installed and how the wire is routed.

The invention was devised to solve the problems discussed above and has an object to provide a compact inverter device capable of reducing electromagnetic noises caused by a switching action and trigger a malfunction of an inverter itself or peripheral electronic devices.

Solution to Problem

In order to solve the problems, an inverter device of the invention is characterized by including: power semiconductor element groups respectively forming two systems of inverters each converting DC power to AC power; DC bus bars through which DC power is supplied to the corresponding power semiconductor element groups; DC input terminals connected to the respective DC bus bars so as to supply DC power from an outside power supply to the connected DC bus bars; first and second switches provided between DC input terminals and the respective DC bus bars to switch the corresponding DC bus bars to be electrically conductive or cut off; and capacitors connected to the respective DC bus bars, and characterized in that impedances of the first and second in a high-frequency region set to be higher than impedances of the DC bus bars.

An inverter-integrated electric motor of the invention is characterized in that the inverter device is integrated with an electric motor.

Advantageous Effects of Invention

According to the inverter device of the invention, a high-impedance switch is disposed in the vicinity of a DC input terminal. Hence, electromagnetic noises generated by switching actions of power semiconductor elements are circulated within an inverter by way of a capacitor and eventually attenuated.

BRIEF DESCRIPTION OF DRAWINGS

FIGS. 12A and 12B are a partial view showing the vicinity of switches of an inverter device of a sixth embodiment.

FIGS. 13A and 13B are a schematic configuration view of an inverter-integrated electric motor of a seventh embodiment.

DESCRIPTION OF EMBODIMENTS

Figure 1:
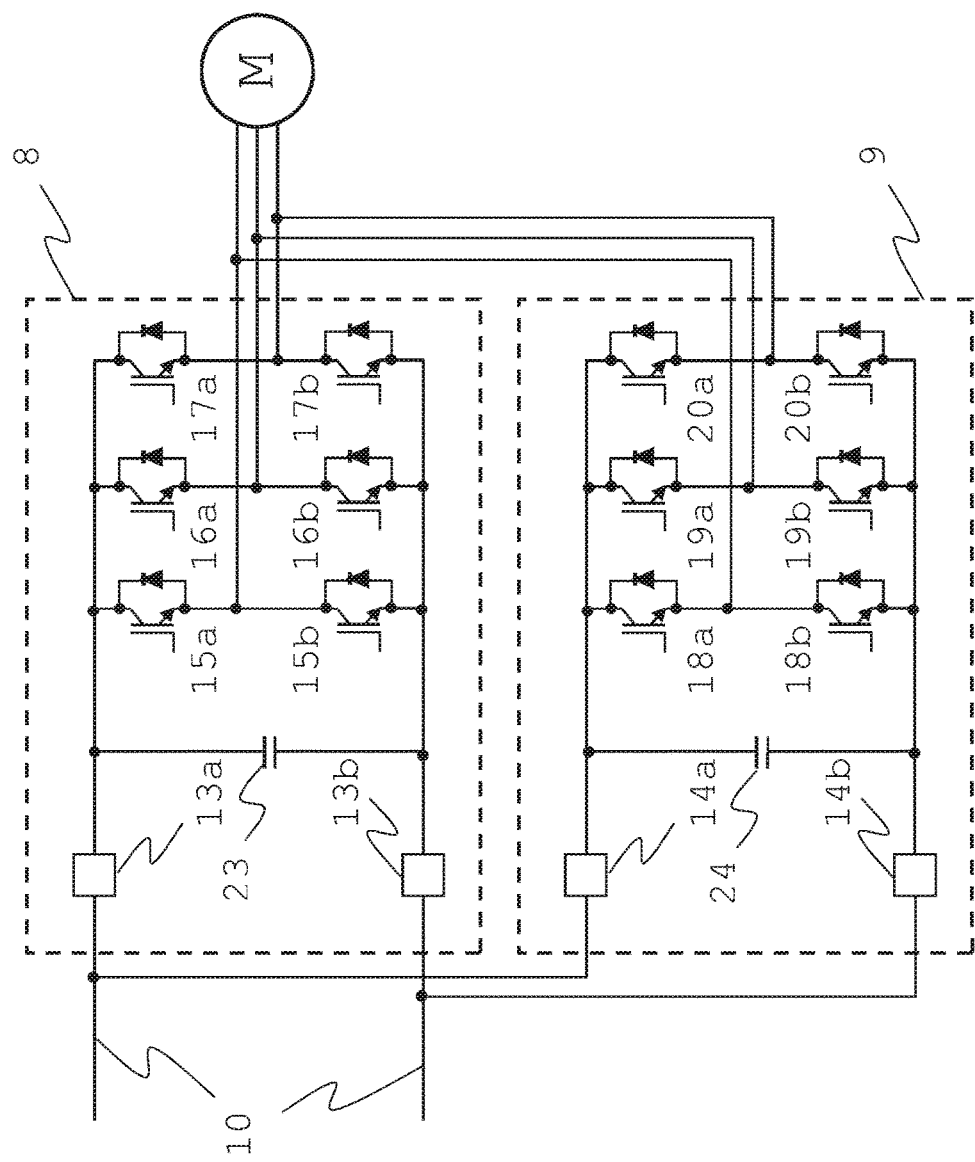
FIG. 1 is a view showing a fundamental configuration of an inverter circuit according to an embodiment of the invention.

Hereinafter, inverter devices and an inverter-integrated electric motor according to embodiments of the invention will be described with reference to FIG. 1 through FIG. 13B. FIG. 1 is a view showing a fundamental configuration of an inverter circuit according to an embodiment of the invention. An inverter device of the invention shown in FIG. 1 is formed of two systems of inverter devices 8 and 9. A DC bus 10 is branched and connected to the respective inverter devices 8 and 9. The inverter device 8 in a first system is formed of power semiconductor elements 15a, 15b, 16a, 16b, 17a, and 17b, a capacitor 23, and switches 13a and 13b, all of which are installed inside. Likewise, the inverter device 9 in a second system is formed of power semiconductor elements 18a, 18b, 19a, 19b, 20a, and 20b, a capacitor 24, and switches 14a and 14b. Because the inverter device has the inverter devices in two systems, the inverter device is capable of continuing an operation using the inverter in one system alone and can secure redundancy as a drive system.

First Embodiment

Figure 2:
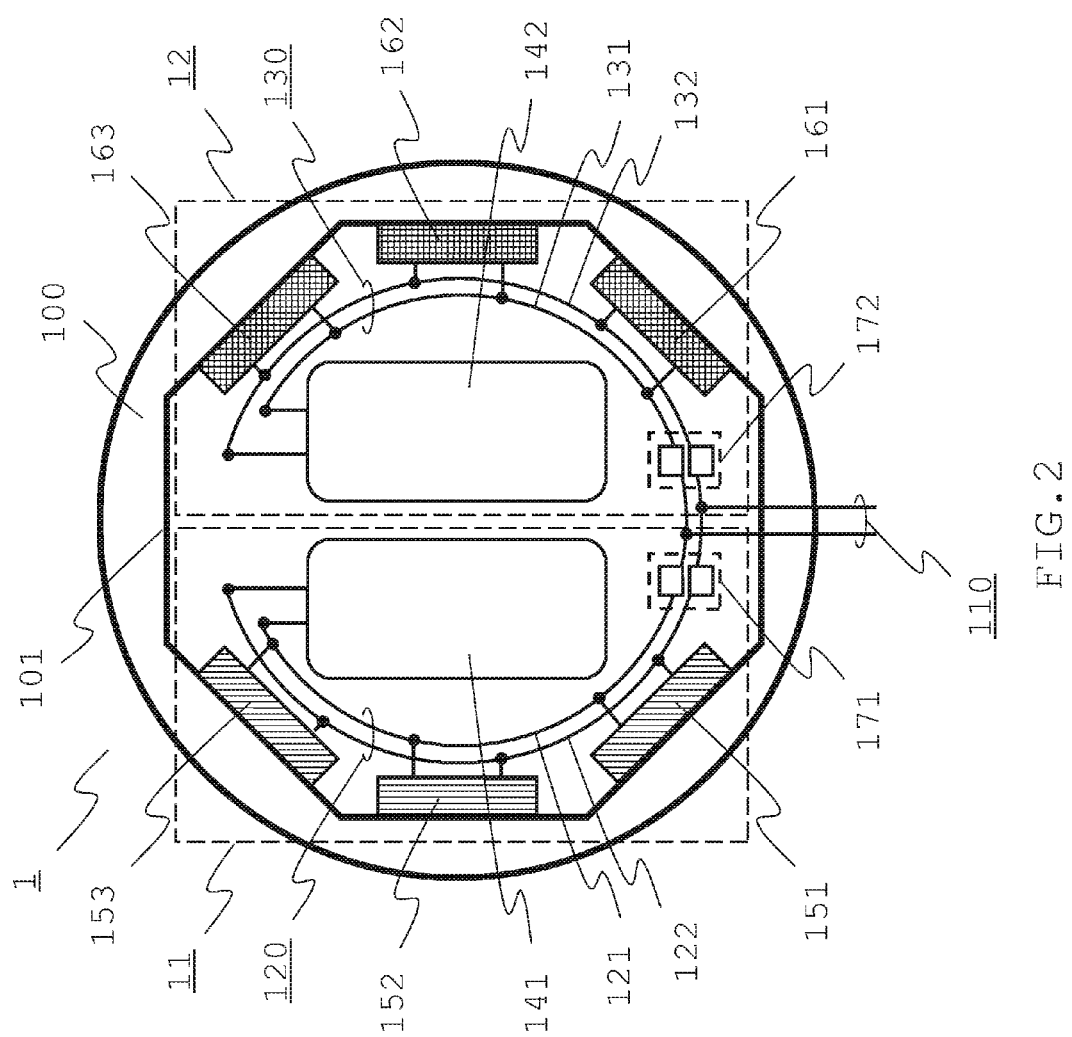
FIG. 2 is a schematic configuration view of an inverter device of a first embodiment.

FIG. 2 is a schematic configuration view of an inverter device of a first embodiment.

As is shown in FIG. 2, an inverter device 1 of the first embodiment is formed of two systems of inverters 11 and 12 which are stored inside a cylindrical metal casing 100 and configurated at positions symmetric about a center. Each inverter converts DC power to three-phase AC power. The inverter 11 in a first system is formed of power semiconductor elements 151, 152, and 153 that generate AC power of a phase U, a phase V, and a phase W from DC power, a DC bus bar 120 formed of a positive electrode side bus bar 121 and a negative electrode side bus bar 122 and supplying DC power to the power semiconductor devices 151, 152, and 153, a capacitor 141 connected to the positive electrode side bus bar 121 and the negative electrode side bus bar 122, a DC input terminal 110 from which DC power is supplied to the DC bus bar 120, and a switch 171 connected between the DC bus bar 120 and the DC input terminal 110. Likewise, the inverter 12 in a second system is formed of power semiconductor elements 161, 162, and 163 that generate AC power of a phase U, a phase V, and a phase W from DC power, a DC bus bar 130 formed of a positive electrode side bus bar 131 and a negative electrode side bus bar 132 and supplying DC power to the power semiconductor devices 161, 162, and 163, a capacitor 142 connected to the positive electrode side bus bar 131 and the negative electrode side bus bar 132, a DC input terminal 110 from which DC power is supplied to the DC bus bar 130, and a switch 172 connected between the DC bus bar 130 and the DC input terminal 110. The power semiconductor elements 151, 152, 153, 161, 162, and 163 are fixed in close contact with an inner wall 101 of the cylindrical metal casing 100. The DC bus bar 130 is provided in a shape conforming to the inner wall 101 of the cylindrical metal casing 100. The capacitors 141 and 142 are disposed at a center of the metal casing 100. The switches 171 and 172 are stored inside the metal casing 100.

An operation of the inverter device 1 will now be described. A pair of the DC input terminals 110 is connected to a DC power supply (not shown). DC power is supplied to the power semiconductor elements 151, 152, and 153 of the inverter 11 and the power semiconductor elements 161, 162, and 163 of the inverter 12 respectively, via the DC input terminals 110 and the switches 171 and 172, respectively, by way of the DC bus bars 120 and 130, respectively. The supplied DC power is converted to three-phase AC power by making these power semiconductor device groups take PWM switching actions according to an instruction from a control device (not shown). The resulting three-phase AC power is fed to a load (not shown).

In the inverter device 1, the switches 171 and 172 are provided to the two systems of the inverters 11 and 12 respectively. Hence, either the inverter 11 or 12 whichever is to be stopped can be cut off and an operation can be performed using either the inverter 11 or 12 alone. The presence of the switches 171 and 172 allows the two systems of the inverters 11 and 12 to be operated simultaneously or solely depending on a load. In addition, in the event of a trouble in either the inverter 11 or 12, an operation can be performed by disconnecting the inverter having the trouble.

Impedances of the switches 171 and 172 are high. Hence, impedances of the DC bus bars 120 and 130 viewed from the side of the DC input terminals 110 become high. Consequently, electromagnetic noises generated by switching actions of the power semiconductor elements 151, 152, 153, 161, 162, and 163 are circulated within the inverters 11 and 12 by passing through the DC bus bars 120 and 130 by way of the capacitors 141 and 142 and eventually attenuated. Also, regarding electromagnetic noises propagating through a space, a leakage to the outside is suppressed by a shield effect of the metal casing 100. In other words, propagation of the electromagnetic noises to the outside of the inverter device 1 is suppressed and the inverter device 1 with reduced electromagnetic noises can be achieved. A high-frequency area of the electromagnetic noises accompanying the switching actions is assumed to be 10 kHz or higher.

The power semiconductor elements 151, 152, 153, 161, 162, and 163 are fixed in close contact with the inner wall 101 of the cylindrical metal casing 100. Hence, excellent heat-releasing characteristics can be obtained and a size of the inverter device 1 can be reduced.

In FIG. 2, the inner wall 101 of the metal casing 100 is of an octagon shape. It should be appreciated, however, that the inner wall 101 is not necessarily of this shape and the shape can be changed appropriately according to the positions of the power semiconductor element groups or the like. Also, the above has described that the outer shape of the metal casing 100 is a cylindrical shape by way of example. However, the outer shape can be of another polygonal shape.

FIG. 2 shows connection positions of the DC bus bars 120 and 130 and the capacitors 141 and 142 in a case where the DC bus bars 120 and 130 are connected to the capacitors 141 and 142 at a position most distant from the switches 171 and 172. It should be appreciated, however, that the connection positions are not limited to the positions specified above and the connection positions can be determined by taking the locations of the capacitors 141 and 142 into consideration.

In this embodiment, the switches 171 and 172, the power semiconductor elements 151, 152, 153, 161, 162, and 163, and the DC bus bars 120 and 130 are disposed on the periphery of the inner wall 101 of the metal casing 100. Hence, a space at the center can be used for the capacitors 141 and 142 that occupy a large volume. Consequently, the inverter device can achieve a high package density.

The switches 171 and 172 can be a mechanical relay or a semiconductor relay that uses switching characteristics of a semiconductor element. The semiconductor relay has no mechanical contacts and is therefore capable of cutting off the inverter rapidly and a size of the switch can be reduced.

As has been described, the inverter device of the first embodiment is configured in such a manner that DC power is supplied to the two systems of the power semiconductor element groups from the DC input terminals by the corresponding DC bus bars via the high-impedance switches. Hence, generated electromagnetic noises are circulated within the inverters by way of the capacitors and eventually attenuated. Also, regarding electromagnetic noises propagating through a space, a leakage to the outside is suppressed by the shield effect of the metal casing. Hence, there can be achieved a significant advantageous effect that propagation of the electromagnetic noises to the outside of the inverters can be suppressed, and not only can an inverter device with reduced electromagnetic noises be achieved, but also a size can be reduced.

Second Embodiment

Figure 3:
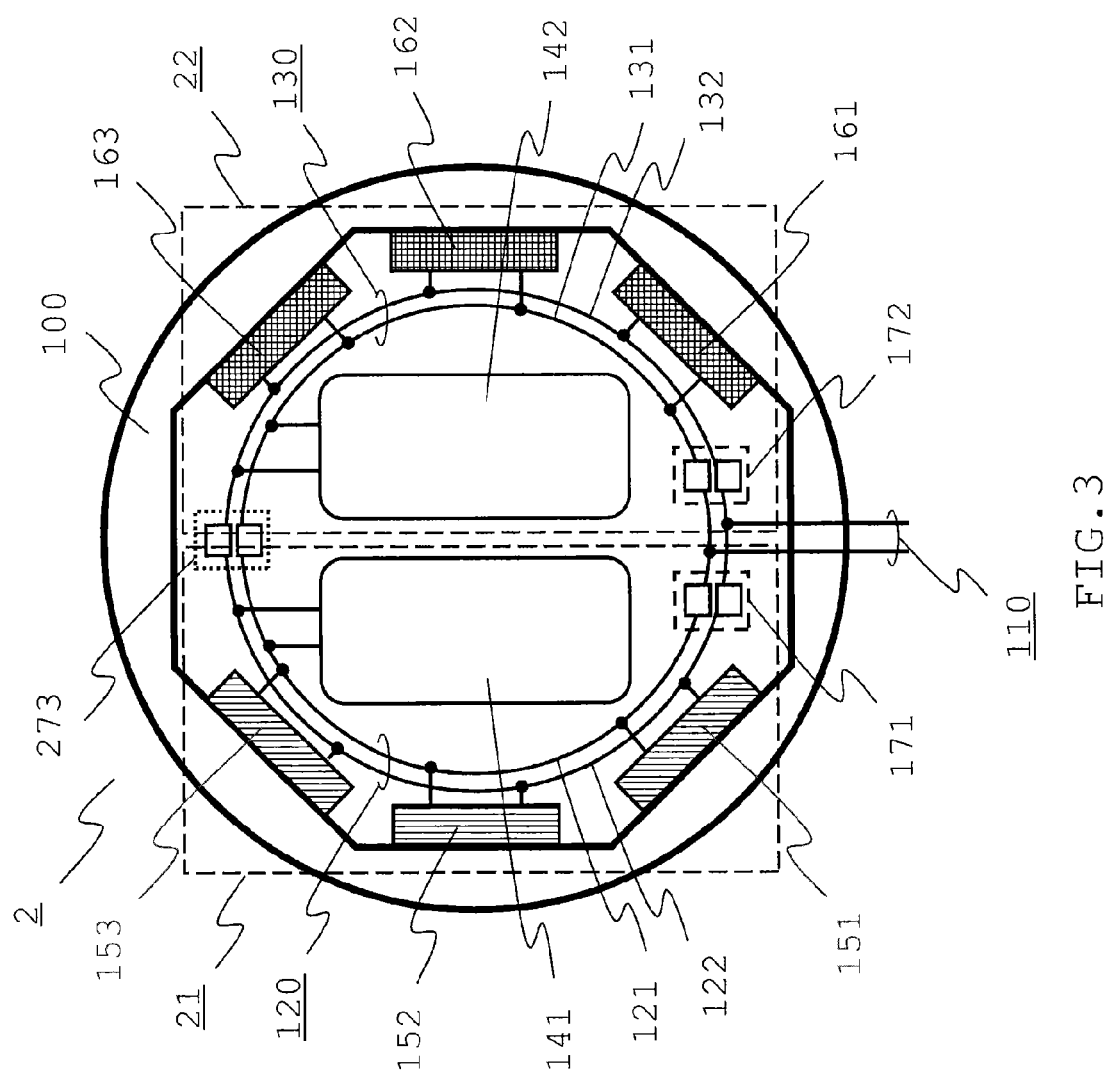
FIG. 3 is a schematic configuration view of an inverter device of a second embodiment.

FIG. 3 is a schematic configuration view of an inverter device of a second embodiment. A difference of the inverter device of the second embodiment from the inverter device of the first embodiment above is as follows. That is, as is shown in FIG. 2, the two switches 171 and 172 are provided between the DC input terminals 110 and the respective DC bus bars 120 and 130 in the inverter device 1 of the first embodiment above. In contrast, third switch 273 is additionally provided to an inverter device 2 of the second embodiment shown in FIG. 3, so that the DC bus bar 120 of an inverter 21 in a first system and a DC bus bar 130 of an inverter 22 in a second system are connected to each other via the additionally provided third switch 273. The other components are the same as those of the first embodiment above shown in FIG. 2, and a description is omitted herein.

An operation of the inverter device 2 will now be described using FIG. 3. As with the inverter device 1 of the first embodiment above, the inverter device 2 of the second embodiment is also configured in such a manner that the switches 171 and 172 are provided, respectively, to the inverters 21 and 22 in two systems. Hence, either the inverter 21 or 22 whichever is to be stopped can be cut off and an operation can be performed by either the inverter 21 or 22 in one system alone. The presence of the switches 171 and 172 allows the inverters 21 and 22 in two systems to be operated simultaneously or solely depending on a load. In addition, in the event of a trouble in either the inverter 21 or 22, an operation can be performed by disconnecting the inverter having the trouble.

In addition to the configuration described above, the inverter device 2 is provided with the third switch 273. When the two systems of the inverters 21 and 22 are operated simultaneously, the DC bus bar 120 and the DC bus bar 130 are disconnected. When either the inverter 21 or 22 alone is operated, the switch 273 is brought into a conduction state to connect the DC bus bar 120 and the DC bus bar 130. Accordingly, even when either the inverter 21 or 22 alone is operated, the capacitor 142 or 141 in the other inverter 22 or 21 becomes available. This is equivalent to an effect of increasing an effective capacity of the capacitor when one inverter is operated. Hence, there can be achieved an advantageous effect that circulation of the electromagnetic noises within the inverters can be promoted, and the electromagnetic noises can be attenuated further.

As has been described, the inverter device of the second embodiment is furnished with the function same as that of the first embodiment above and the switch is additionally provided between the DC bus bars of the inverters in two systems. This is equivalent to an effect of increasing an effective capacity of the capacitor when one inverter alone is operated by bringing the DC bus bars into conduction. Further, there can be achieved a significant advantageous effect that a further attenuation of the electromagnetic noises can be expected.

Third Embodiment

Figure 4:
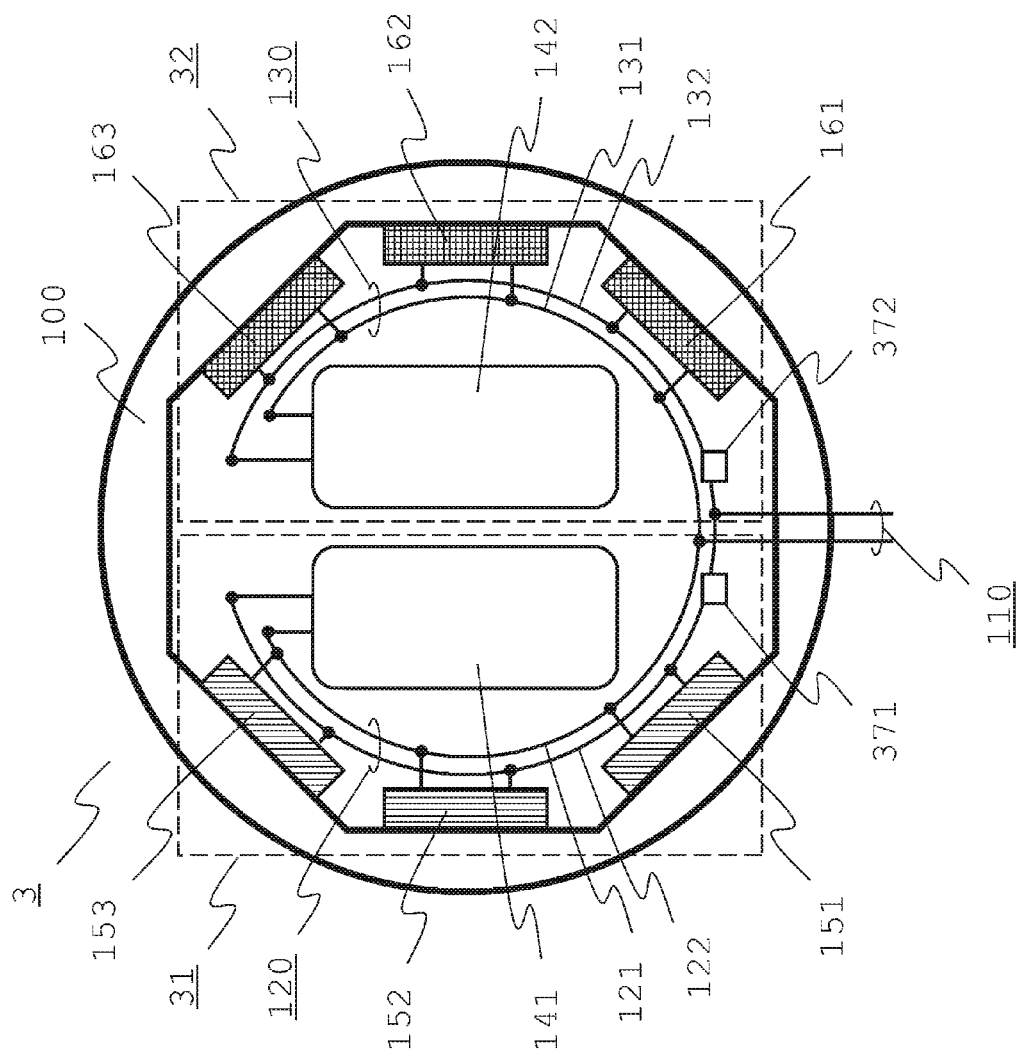
FIG. 4 is a schematic configuration view of an inverter device of a third embodiment.

FIG. 4 is a schematic configuration view of an inverter device of a third embodiment. A difference of the third embodiment from the first embodiment above is as follows. That is, as is shown in FIG. 2, both of the positive electrode side bus bars 121 and 131 and the negative electrode side bus bars 122 and 132 of the DC bus bars 120 and 130, respectively, are cut off simultaneously, respectively, by the two switches 171 and 172 provided between the DC input terminals 110 and the respective DC bus bars 120 and 130 in the inverter device 1 of the first embodiment above. In contrast, an inverter device 3 of the third embodiment shown in FIG. 4 is configured in such a manner that the negative electrode side bus bars 122 and 132 alone are cut off, respectively, by switches 371 and 372. The other components are the same as those of the first embodiment above shown in FIG. 2, and a description is omitted herein.

An operation of the inverter device 3 will now be described using FIG. 4. As with the inverter device 1 of the first embodiment above, the inverter device 3 of the third embodiment is also configured in such a manner that the switches 371 and 372 are provided, respectively, to inverters 31 and 32 in two systems. Hence, either the inverter 31 or 32 whichever is to be stopped can be cut off and an operation can be performed by either the inverter 31 or 32 in one system alone. The presence of the switches 371 and 372 allows the inverters 31 and 32 in two systems to be operated simultaneously or solely depending on a load. In addition, in the event of a trouble in one inverter 31 or 32, an operation can be performed by disconnecting the inverter having the trouble.

The inverter device 3 is configured in such a manner that the switches 371 and 372 cut off only the negative electrode side bus bars 122 and 132 of the DC bus bars 120 and 130. Hence, size of the switches 371 and 372 can be reduced in comparison with the switches 171 and 172 of the first embodiment above and a space at the center of the inverter device 3 becomes available. Hence, the capacitors 141 and 142 occupying large volume and area can be replaced by those having a larger capacity. Consequently, in comparison with an inverter device of the same size, a capacity of the capacitors can be increased and therefore electromagnetic noises can be attenuated further.

The inverter device 3 of the third embodiment has been described that the switches 371 and 372 cut off the negative electrode side bus bars 122 and 132 of the DC bus bars, and 130. It should be appreciated, however, that the same advantageous effects can be expected when the positive electrode side bus bars 121 and 131 of the DC bus bars 120 and 130 are cut off instead.

As has been described, the inverter device of the third embodiment is furnished with the function same as that of the first embodiment above and configured in such a manner that the switches of the respective inverters in two systems cut off either the positive or negative electrode side bus bars alone. Hence, there can be achieved a significant advantageous effect that large-capacity capacitors can be used and therefore the electromagnetic noises can be attenuated further.

Fourth Embodiment

Figure 5:
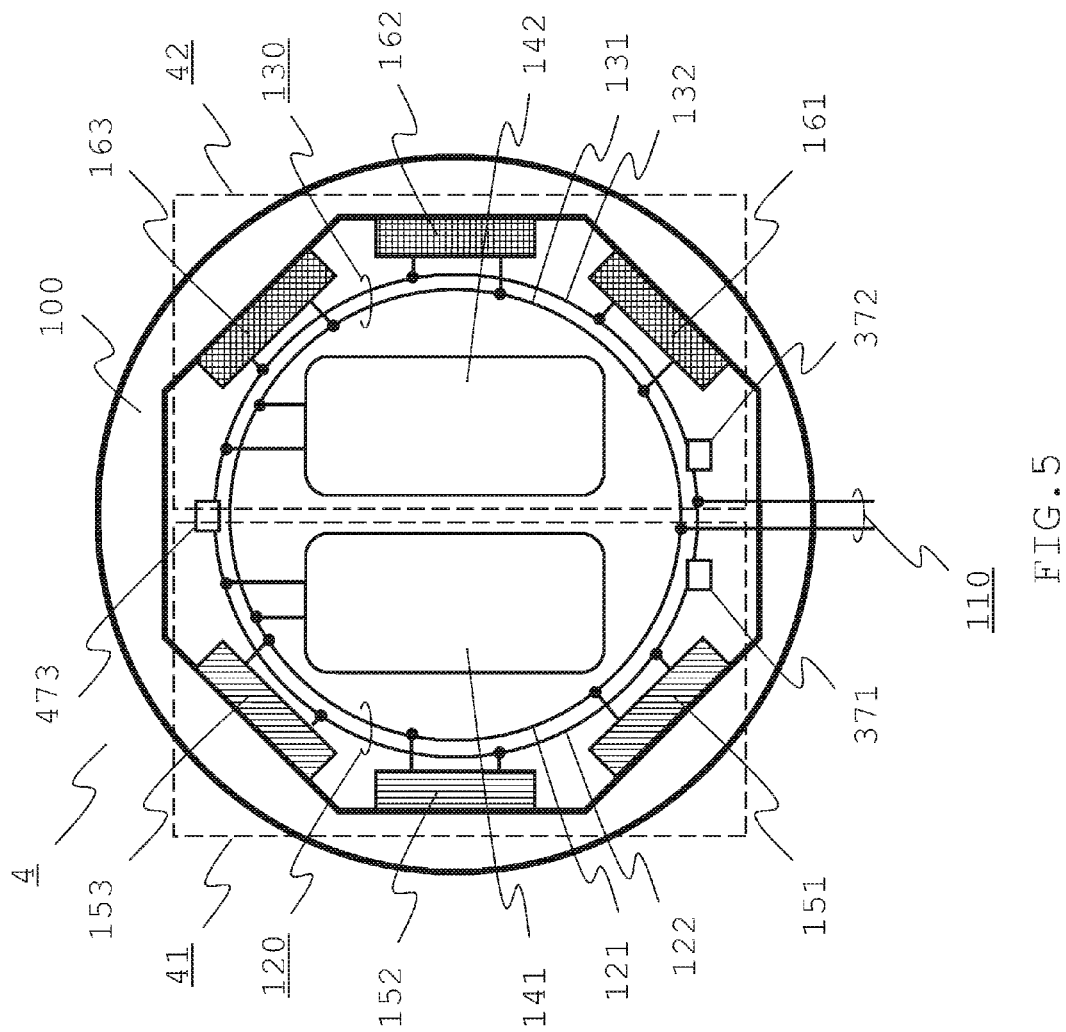
FIG. 5 is a schematic configuration view of an inverter device of a fourth embodiment.

FIG. 5 is a schematic configuration view of an inverter device of a fourth embodiment. A difference of the fourth embodiment from the third embodiment above is as follows. That is, as is shown in FIG. 4, the inverter device 3 of the third embodiment above is configured in such a manner that the two switches 371 and 372 are provided between the DC input terminals 110 and the respective DC bus bars 120 and 130 to cut off the negative electrode side bus bars 122 and 132 of the DC bus bars 120 and 130, respectively. In contrast, an inverter device 4 of the fourth embodiment shown in FIG. 5 is configured in such a manner that a third switch 473 is additionally provided to connect a DC bus bar 120 of an inverter 41 in a first system and a DC bus bar 130 of an inverter 42 in a second system to each other and the negative electrode side bus bar 122 and 132 of the DC bus bars 120 and 130 is cut off by the third switch 473. The other components are the same as those of the third embodiment above shown in FIG. 4, and a description is omitted herein.

An operation of the inverter device 4 will now be described using FIG. 5. As with the inverter device 3 of the third embodiment above, the inverter device 4 of the fourth embodiment is also configured in such a manner that the switches 371 and 372 are provided, respectively, to the two systems of the inverters 41 and 42 and the switches 371 and 372 cut off only the negative electrode side bus bars 122 and 132 of the DC bus bars 120 and 130. Hence, either the inverter 41 or 42 whichever is to be stopped can be cut off and an operation can be performed by either the inverter 41 or 42 in one system alone. The presence of the switches 371 and 372 allows the inverters 41 and 42 in two systems to be operated simultaneously or solely depending on a load. In addition, in the event of a trouble in one inverter 41 or 42, an operation can be performed by disconnecting the inverter having the trouble.

In addition to the configuration described above, the inverter device 4 is provided with the third switch 473. When the two systems of the inverters 41 and 42 are operated simultaneously, the negative electrode side bus bar 122 and the negative electrode side bus bar 132 are disconnected. When either the inverter 41 or 42 alone is operated, the switch 473 is brought into a conduction state to connect the DC bus bar 120 and the DC bus bar 130. Accordingly, even when either the inverter 41 or 42 alone is operated, the capacitor 141 or 142 in the other inverter 42 or 41 becomes available. This is equivalent to an effect of increasing an effective capacity of the capacitor when one inverter is operated. Hence, there can be achieved an advantageous effect that circulation of electromagnetic noises within the inverters can be promoted, and the electromagnetic noises can be attenuated further.

The inverter device 4 of the fourth embodiment has been described that the switch 473 disconnects the negative electrode side bus bars 122 and 132 of the DC bus bars 120 and 130, respectively. It should be appreciated, however, that the same advantageous effects can be expected when the positive electrode side bus bars 121 and 131 of the DC bus bars 120 and 130, respectively, are disconnected instead.

As has been described, the inverter device of the fourth embodiment is furnished with the function same as that of the third embodiment above and configured in such a manner that the switch that cuts of the positive or negative electrode side bus bars alone is provided between the DC bus bars of the two systems of the inverters. This is equivalent to an effect of increasing an effective capacity of the capacitor when one inverter alone is operated by bringing the DC bus bars into conduction. Hence, there can be achieved a significant advantageous effect that a further attenuation of the electromagnetic noises can be expected.

Fifth Embodiment

Figure 6:
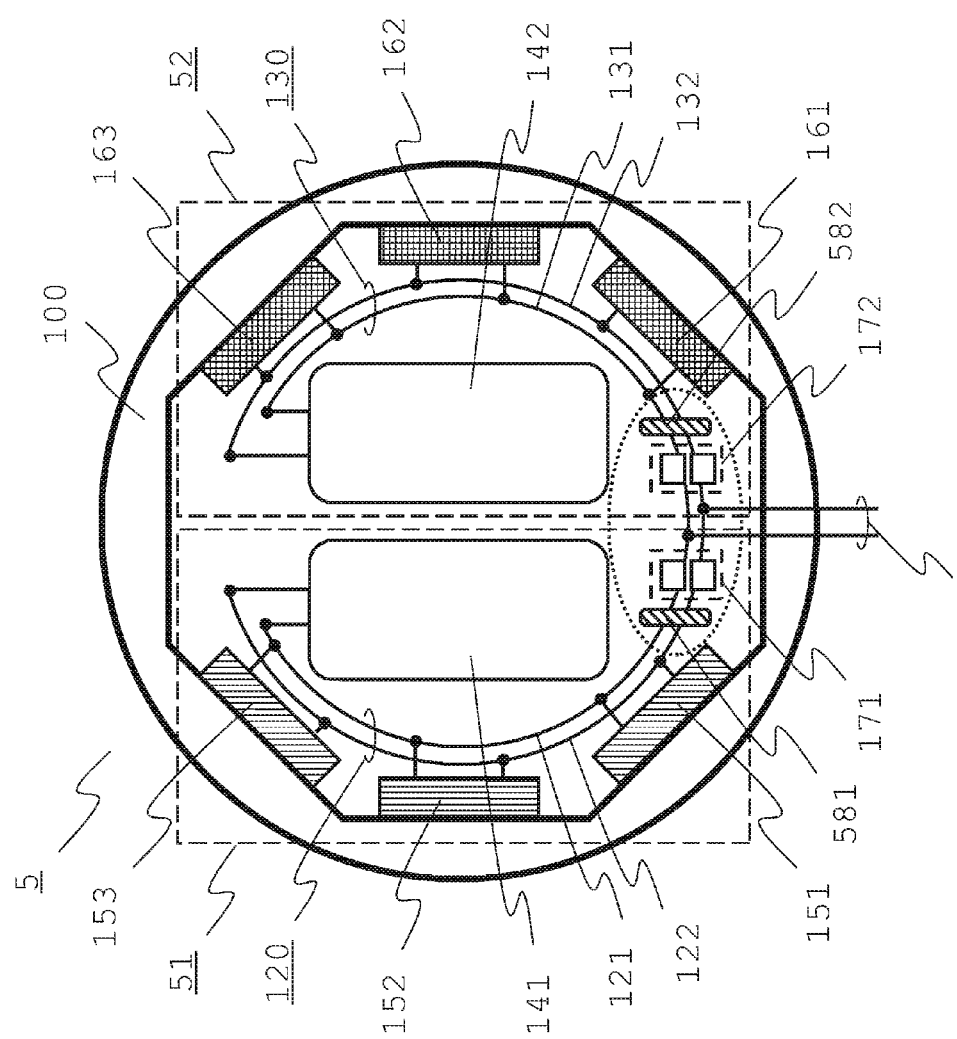
FIG. 6 is a schematic configuration view of an inverter device of a fifth embodiment.
Figure 7:
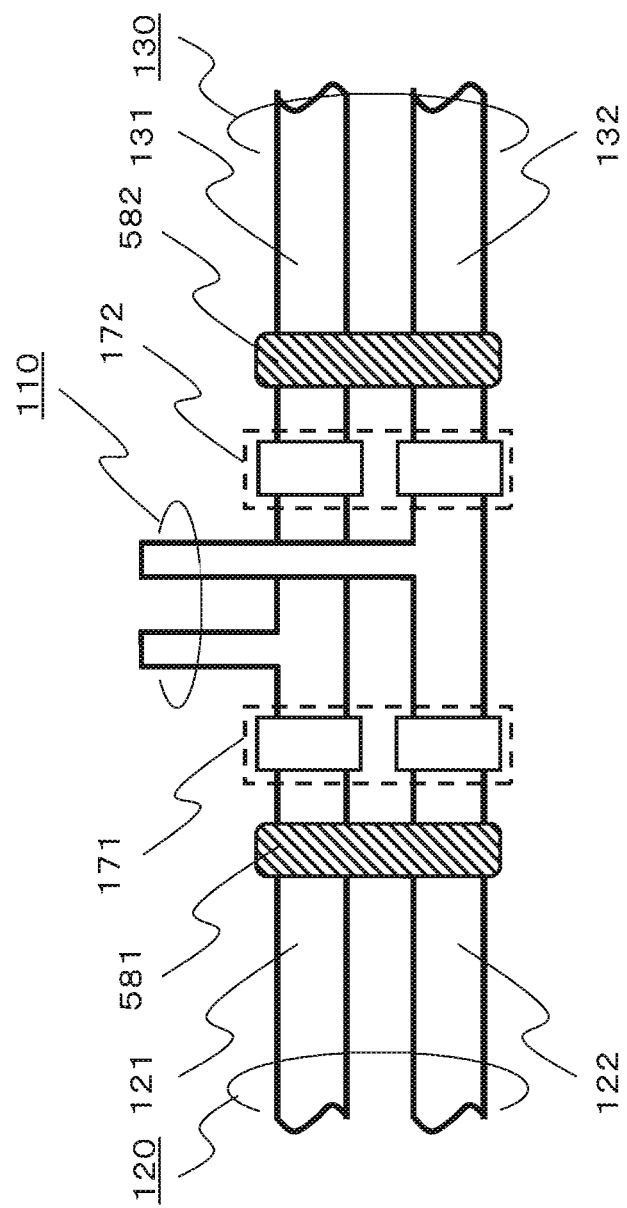
FIG. 7 is a partial view showing the vicinity of switches of the inverter device of the fifth embodiment.

FIG. 6 is a schematic configuration view of an inverter device of a fifth embodiment. FIG. 7 is a partial view showing the vicinity of switches of FIG. 6. A difference of the fifth embodiment from the first embodiment above is as follows. That is, as shown in FIG. 2, the two switches 171 and 172 alone are provided between the DC input terminals 110 and the respective DC bus bars 120 and 130 in the inverter device 1 of the first embodiment above. In contrast, common-mode ferrite cores 581 and 582 are provided, respectively, to the DC bus bars 120 and 130 so as to be adjacently connected, respectively, to the switches 171 and 172 in an inverter device 5 of the fifth embodiment shown in FIG. 6. The other components are the same as those of the first embodiment above shown in FIG. 2, and a description is omitted herein.

An operation of the inverter device 5 will now be described using FIG. 6 and FIG. 7. As with the inverter device 1 of the first embodiment above, the inverter device 5 of the fifth embodiment is configured in such a manner that switches 171 and 172 are provided, respectively, to inverters 51 and 52 in two systems. Hence, either the inverter 51 or 52 whichever is to be stopped can be cut off and an operation can be performed by either the inverter 51 or 52 in one system alone. The presence of the switches 171 and 172 allows the two systems of the inverters 51 and 52 to be operated simultaneously or solely depending on a load. In addition, in the event of a trouble in one inverter 51 or 52, an operation can be performed by disconnecting the inverter having the trouble.

In addition to the configuration described above, the inverter device 5 of the fifth embodiment is provided with the common-mode ferrite cores 581 and 582 in such a manner that the common-mode ferrite cores 581 and 582 are provided to the DC bus bars 120 and 130 and adjacently connected to the vicinity of the switches 171 and 172. Accordingly, impedance of the ferrite core 581 is superimposed on impedance of the switch 171 immediately after the DC input terminal 110 and impedance of the ferrite core 582 is superimposed on impedance of the switch 172 immediately after the DC input terminal 110. Consequently, suppression effect on electromagnetic noises, in particular, common-mode noises, generated by switching actions of the power semiconductor elements 151, 152, 153, 161, 162, and 163 can be enhanced and circulation within the inverters 51 and 52 is promoted. In other words, a leakage of the electromagnetic noises to the outside of the inverters 51 and 52 can be suppressed and an inverter with attenuated electromagnetic noises can be achieved.

Figure 8:
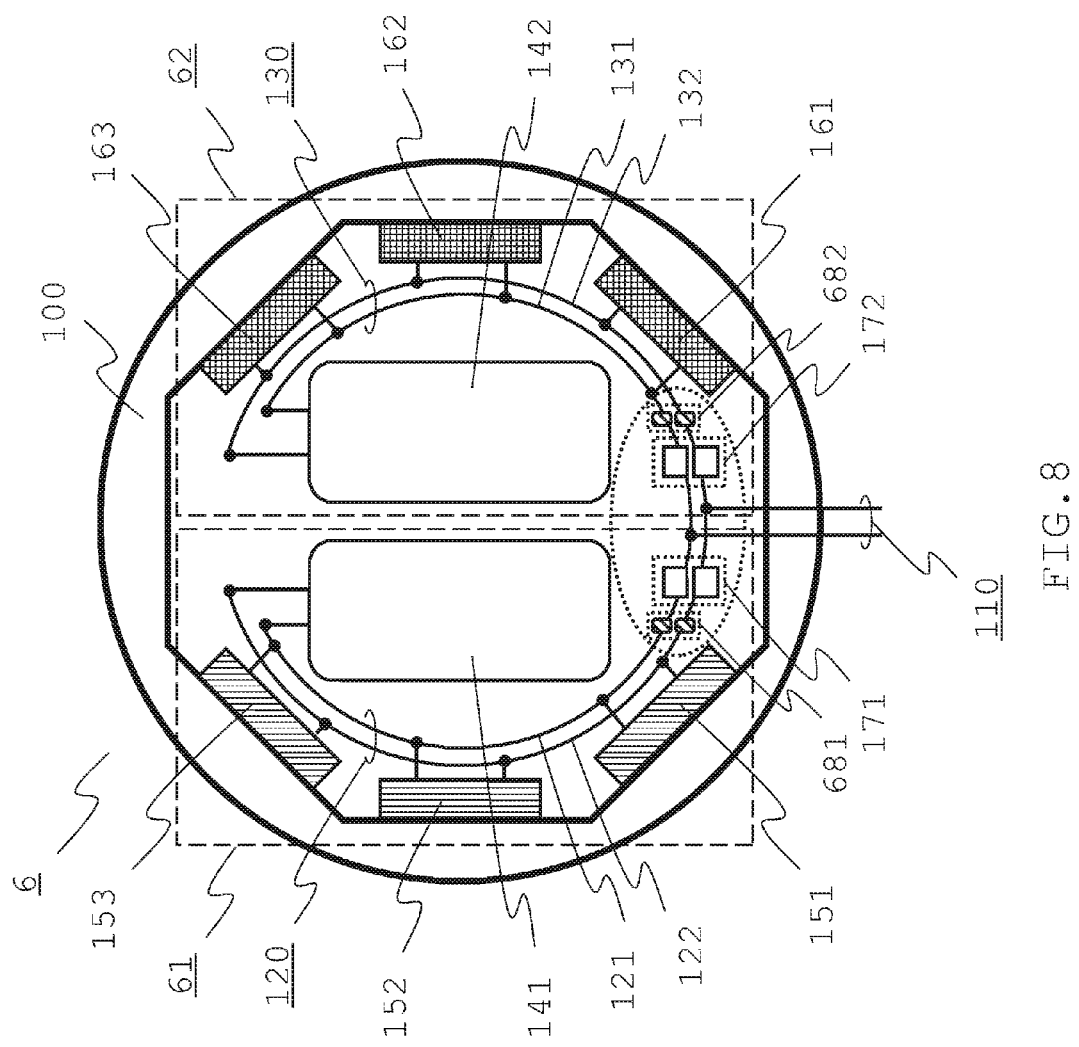
FIG. 8 is a schematic configuration view of one modification of the inverter device of the fifth embodiment.
Figure 9:
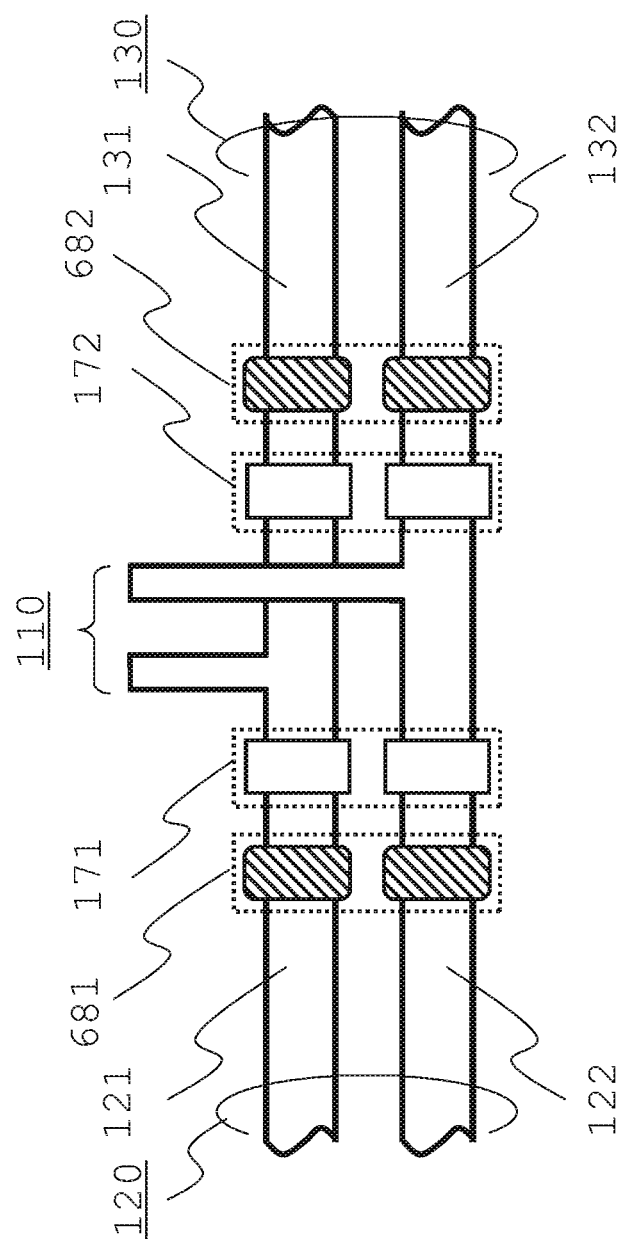
FIG. 9 is a partial view showing the vicinity of switches of the modification of the inverter device of the fifth embodiment.

FIG. 8 is a schematic configuration view of an inverter device 6 as a modification of the fifth embodiment. FIG. 9 is a partial view showing the vicinity of the switches 171 and 172 of FIG. 8. The fifth embodiment above has described a case where the common-mode ferrite cores 581 and 582 are provided, respectively, to the DC bus bars 120 and 130 to be adjacently connected to the vicinities of the switches 171 and 172, respectively. However, as is described in this modification, independent normal-mode ferrite cores 681 and 682 may be provided to the positive electrode side bus bars 121 and 131 and the negative electrode side bus bars 122 and 132 of the DC bus bars 120 and 130 and adjacently connected to the vicinity of the switches 171 and 172. In this case, an advantageous effect can be achieved particularly in suppression of the normal-node electromagnetic noises generated by switching actions of the power semiconductor elements 151, 152, 153, 161, 162, and 163.

Figure 10:
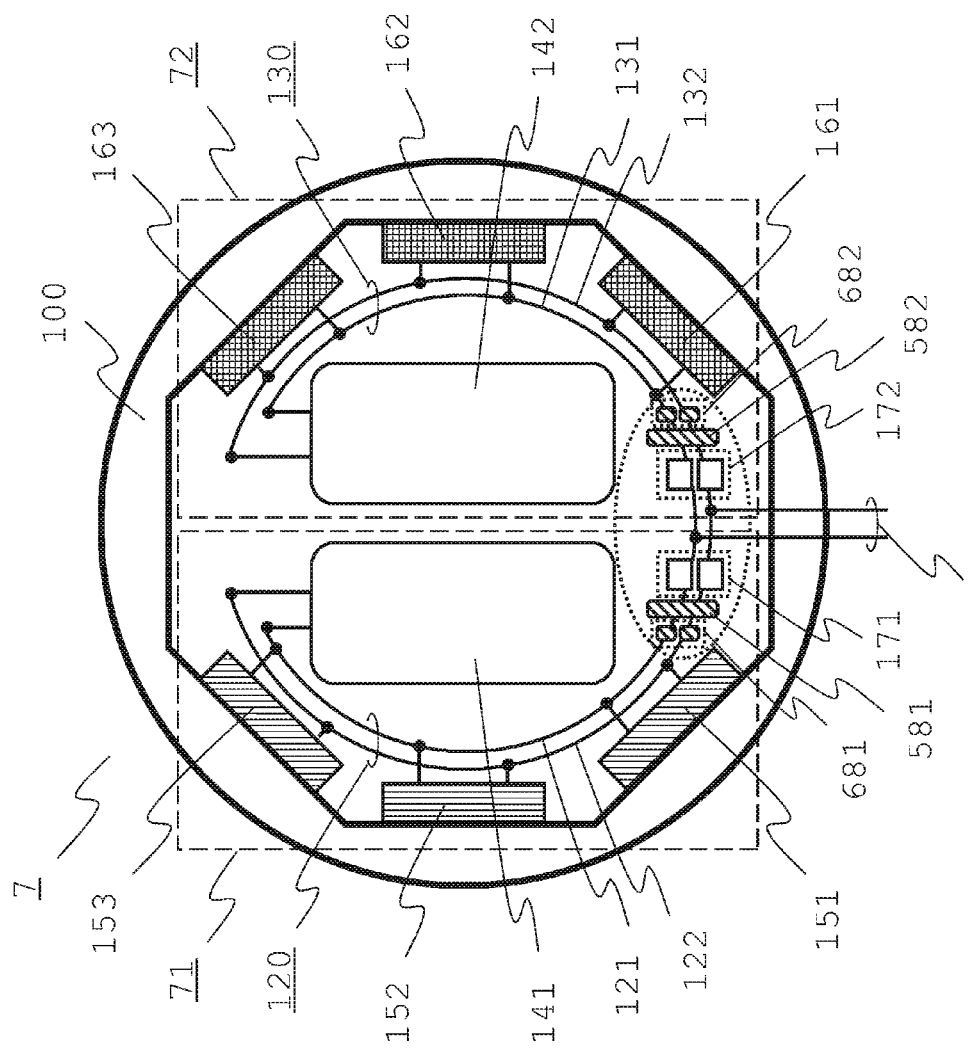
FIG. 10 is schematic configuration view of still another modification of the inverter device of the fifth embodiment.
Figure 11:
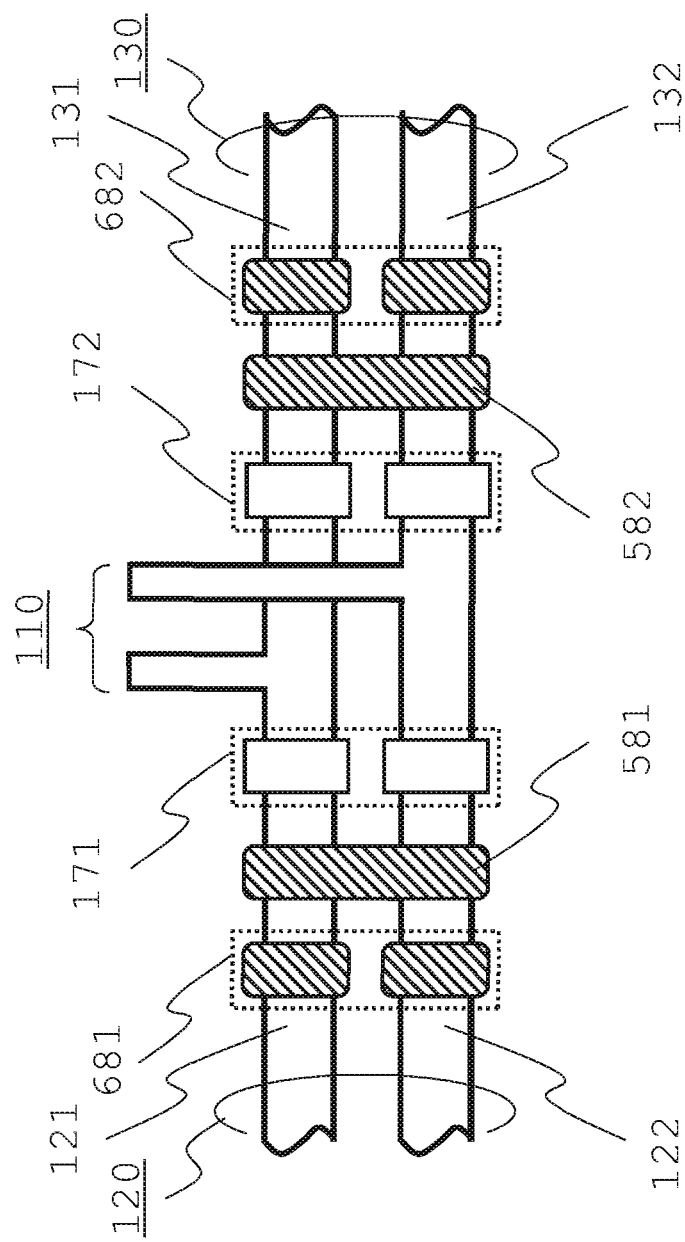
FIG. 11 is a partial view showing the vicinity of switches of the stir another modification of the inverter device of the fifth embodiment.

FIG. 10 is a schematic configuration view of an inverter device 7 as still another modification of the fifth embodiment. FIG. 11 is a partial view showing the vicinity of the switches 171 and 172 of FIG. 10. As is described in this modification, common-node ferrite cores 581 and 582 and normal-mode ferrite cores 681 and 682 may be provided, respectively, to the DC bus bars 120 and 130 and adjacently connected to the vicinities of the switches 171 and 172, respectively, so that the former and the latter are used in combination. Accordingly, the suppression effect can be exerted not only on the common-mode electromagnetic noises but also on the normal-mode electromagnetic noises generated by the switching actions of the power semiconductor elements 151, 152, 153, 161, 162, and 163.

As has been described, the inverter device of the fifth embodiment is furnished with the function same as that of the first embodiment above and is additionally provided with ferrite cores that reduce electromagnetic noises to the DC bus bars of the inverters. Hence, there can be achieved a significant advantageous effect that impedances are superimposed and therefore the effect of attenuating the electromagnetic noises can be expected.

The fifth embodiment has described a case where ferrite cores are used. It should be appreciated, however, that cores are not limited to the ferrite cores and cores made of other materials can be used as well.

Sixth Embodiment

FIGS. 12A and 12B are a partial view showing the vicinity of switches of an inverter device of a sixth embodiment. As is shown in FIGS. 12A and 12B, the sixth embodiment adopts a structure in which a positive electrode side bus bar 121 and a negative electrode side bus bar 122 of a DC bus bar 120 and a positive electrode side bus bar 131 and a negative electrode side bus bar 132 of a DC bus bar 130 are in close contact with each other with an insulating material sandwiched in between except for the vicinity of the DC input terminals 110. The schematic configuration view of the inverter device 6 of the sixth embodiment is the same as that of the inverter device 1 of the first embodiment above shown in FIG. 2 and omitted herein.

A structure of the DC bus bars of the inverter device 6 of the sixth embodiment will now be described using FIG. 12. FIG. 12A is a partial view showing the vicinity of the switches 171 and 172 and 12B is a cross section in a portion taken along the line A-A (line B-B). As are shown in FIG. 12, the DC input terminals 110 are connected to the respective DC bus bars 120 and 130 via the switches 171 and 172, respectively. Both of the positive electrode side bus bar 121 and the negative electrode side bus bar 122 of the DC bus bar 120 in the vicinity of the switch 171 are of a flat sheet structure. Further, widths are increased to form a structure in which the positive electrode side bus bar 121 and the negative electrode side bus bar 122 are in close contact with each other with a thin insulating material 701 sandwiched in between. Likewise, both of the positive electrode side bus bar 131 and the negative electrode side bus bar 132 of the DC bus bar 130 in the vicinity of the switch 172 are of a flat sheet structure. Further, widths are increased to form a structure in which the positive electrode side bus bar 131 and the negative electrode side bus bar 132 are in close contact with each other with a thin insulating material 702 sandwiched in between. Accordingly, mutual inductance is reduced in the close contact portion and a contribution can be made to a reduction of normal-mode electromagnetic noises generated by switching actions of the power semiconductor elements 151, 152, 153, 161, 162, and 163.

As has been described, the inverter device of the sixth embodiment is furnished with the function same as that of the first embodiment above, and further adopts a structure in which the positive electrode side bus bar and the negative electrode side bus bar of the DC bus bar of the inverter are in close contact with each other with an insulating material sandwiched in between. Hence, there can be achieved a significant advantageous effect that mutual inductance is reduced and therefore an effect of reducing normal-mode electromagnetic noises can be expected.

Seventh Embodiment

FIGS. 13A and 13B are a schematic configuration view of an inverter-integrated electric motor of a seventh embodiment. As is shown in FIGS. 13A and 13B, an inverter-integrated electric motor 1000 of the seventh embodiment adopts a structure in which an inverter device 1001 and an electric motor 1002 are formed in one piece. A schematic configuration view of the inverter device 1001 of the seventh embodiment is the same as that of the inverter device 1 of the first embodiment above shown in FIG. 2, and a detailed description is omitted herein.

FIG. 13A is a front view of the inverter-integrated electric motor 1000 and FIG. 13B is a side view. The inverter-integrated electric motor 1000 has a preventive measure against electromagnetic noises in the inverters and is integrated with the electric motor 1002. Hence, by adjusting an outer shape to match the size of the electric motor 1002, storage efficiency can be enhanced. The inverter device 1001 used herein can be any one of the inverter devices 1, 2, 3, 4, 5, 6, and 7 described above.

As has been described, the inverter-integrated electric motor of the seventh embodiment is furnished with the functions same as those of the first through sixth embodiments as an inverter. Also, because the inverter is integrated with the electric motor, there can be achieved a significant effect that not only can an electric motor be achieved by the inverter with reduced electromagnetic noises, but also a size can be reduced.

This embodiment has described a case where a cylindrical metal casing is used. It should be appreciated, however, that the casing is not limited to a metal casing. More specifically, the casing may be a cooling device of a structure in which an internal channel is provided for a cooling medium to flow through.

It should be understood that the respective embodiments of the invention can be combined freely without restrictions and the respective embodiments can be modified or omitted as needed within the scope and sprit of the invention.

Same reference numerals denote same or equivalent portions in all the drawings.

REFERENCE SIGNS LIST

1, 2, 3, 4, 5, 6, 7, 8, 9, and 1001: inverter device
100: metal casing
101: inner wall 110: DC input terminal
11, 21, 31, 41, 51, and 61: inverter in first system
12, 22, 32, 42, 52, and 62: inverter in second system
120 and 130: DC bus bar
121 and 131: positive electrode side bus bar
122 and 132: negative electrode side bus bar
23, 24, 141, and 142: capacitor
15a, 15b, 16a, 16b, 17a, 17b, 18a, 18b, 19a, 19b, 20a, 20b, 151, 152, 153, 161, 162, and 163: power semiconductor element
13a, 13h, 14a, 14b, 171, 172, 273, 371, 372, and 473: switch
581 and 582: common-mode ferrite core
681 and 682: normal-mode ferrite core
701 and 702: insulating material
1000: inverter-integrated electric motor
1002: electric motor

The invention claimed is:

1. An inverter device characterized by comprising:
power semiconductor element groups respectively forming two systems of inverters each converting DC power to AC power;
DC bus bars through which DC power supplied to the corresponding power semiconductor element groups;
DC input terminals connected to the respective DC bus bars so as to supply DC power from an outside power supply to the connected DC bus bars;
first and second switches provided between the DC input terminals and the respective DC bus bars to switch the corresponding DC bus bars to be electrically conductive or cut off, and
capacitors connected to the respective DC bus bars,
impedances in a high-frequency area of the first and second switches being set to be higher than impedances of the DC bus bars.

2. The inverter device according to claim 1, characterized in that:
a cylindrical metal casing is provided; and
the power semiconductor element groups, the DC bus bars, the DC input terminals, and the capacitors are stored inside the metal casing.

3. The inverter device according to claim 2, characterized in that:
the first and second switches are stored inside the metal casing.

4. The inverter device according to claim 1, characterized in that:
a third switch is provided so as to connect the DC bus bars to each other.

5. The inverter device according to claim 1, characterized in that:
the first through third switches allow only one of a positive electrode side bus bar and a negative electrode side bus bar forming each DC bus bar to be electrically conductive or cut off.

6. The inverter device according to claim 1, characterized in that:
cores are provided to the DC bus bars.

7. The inverter device according to claim 1, characterized in that:
the DC bus bars are shaped like a flat sheet; and
a positive electrode side bus bar and a negative electrode side bus bar of each of the DC bus bars are joined via an insulating material.

8. An inverter-integrated electric motor, characterized in that:
the inverter device set forth in claim 1 is integrated with an electric motor.

* * * * *